United States Patent [19]

Steigerwald

[11] Patent Number: 4,477,868
[45] Date of Patent: Oct. 16, 1984

[54] HIGH FREQUENCY SERIES RESONANT DC-DC CONVERTER

[75] Inventor: Robert L. Steigerwald, Scotia, N.Y.

[73] Assignee: General Electric Company, Schenectady, N.Y.

[21] Appl. No.: 429,760

[22] Filed: Sep. 30, 1982

[51] Int. Cl.³ .............................................. H02P 13/22
[52] U.S. Cl. ........................................ 363/28; 363/17; 363/37; 363/96
[58] Field of Search ...................... 363/16, 17, 28, 36, 363/37, 79, 96, 98, 132, 136

[56] References Cited

U.S. PATENT DOCUMENTS

| | | | |
|---|---|---|---|
| 3,328,596 | 6/1967 | Germann et al. | 363/37 |
| 3,551,632 | 12/1970 | Geisel | 363/37 |
| 4,024,453 | 5/1977 | Corry | 363/28 |
| 4,143,414 | 3/1979 | Brewster et al. | 363/44 |

FOREIGN PATENT DOCUMENTS 43574  3/1982  Japan .................................. 363/136

OTHER PUBLICATIONS

"High Power Inverter Using Gate Turn-Off Thyristors", Elector, vol. 3, No. 3, pp. 29, 30, Mar. 1977.
Bailey et al., "200 KHz Power FET Technology in DEM Modular Power Supplies", Elect. Eng., vol. 53, No. 656, pp. 39-42, 45-49, Sept. 1981.

Primary Examiner—William H. Beha, Jr.
Attorney, Agent, or Firm—Mark L. Mollon; James C. Davis, Jr.; Marvin Snyder

[57] ABSTRACT

A dc-dc converter employs a series resonant circuit which is driven by square waves of current. By adjusting the frequency of the square waves of current above the resonant point or by holding the frequency constant and varying the current supplied to the converter, the voltage on the resonant components can be stepped up and controlled. Switching losses in the inverter gate turn-off devices are low since the inverter feeds a lagging load which allows the use of lossless snubbers.

8 Claims, 11 Drawing Figures

HIGH FREQUENCY SERIES RESONANT DC-DC CONVERTER

CROSS-REFERENCE TO RELATED APPLICATION

This invention is related to my copending application Ser. No. 429,761 filed concurrently herewith.

BACKGROUND OF THE INVENTION

This invention relates to dc-dc converters and more particularly to a dc-dc converter which employ a current fed series resonant circuit.

A dc-dc converter is needed which can step up the input voltage with high efficiency while operating at high frequency (to reduce magnetic component size and capacitor size). As efficiency of conversion is increased, less power need be supplied from the source to the load.

In U.S. Pat. No. 4,143,414 a series resonant converter is described that is used in a three phase silicon controlled rectifier ac-dc converter application. The rectifier and load in the circuit are connected in series with the resonant circuit. Voltage step-up cannot be conveniently be obtained and high frequency operation is also difficult to obtain using silicon controlled rectifiers. In addition, high turn-on switching losses occur since the resonant load must be run at a leading power factor to commutate the silicon controlled rectifier.

It is an object of the present invention to provide a dc-dc converter for operation at high frequencies to reduce reactive component size.

It is a further object of the present invention to provide a dc-dc converter capable of operating with high efficiencies by reducing switching losses.

It is a still further object of the present invention to provide a dc-dc converter capable of operating in a step-up mode.

BRIEF SUMMARY OF THE INVENTION

In a preferred embodiment one aspect of the present invention a resonant dc-dc converter is provided with a current input inverter having gate turn-off switches with reverse voltage blocking ability. The inverter is energized by an external dc power source and the inverter supplies square waves of dc current to a series resonant circuit having an inductor and a capacitor. A rectifier is coupled to the output of the inductor of the resonant circuit to rectify the sine waves of voltage across the inductor to provide a dc output voltage.

A control circuit controls the dc output voltage by varying the frequency at which the inverter switches turn on and off. The control has a summer for comparing a commanded output voltage to the actual output voltage to generate an error signal. A limit circuit assures that the inverter is provided with a lagging load. The limit circuit is responsive to the error signal to limit the voltage supplied to a voltage controlled oscillator so that the switching frequency of the switches is at or above the damped resonant frequency of the resonant circuit to reduce switching losses.

In another aspect of the present invention a control circuit controls the dc output voltage by varying the input current magnitude supplied to the converter which is switching at a fixed frequency at or above the damped resonant frequency of the resonant circuit. A commanded voltage is compared to the output voltage of the converter to develop an error signal. The error signal is used as a current command. The current command is compared to the actual current supplied to the converter and the error signal controls the magnitude of the input current.

BRIEF DESCRIPTION OF THE DRAWING

While the specification concludes with claims particularly pointing out and distinctly claiming the present invention, the objects and advantages of the invention can be more readily ascertained from the following description of preferred embodiments when used in conjunction with the accompanying drawing in which:

FIGS. 2A–E are waveform diagrams helpful in explaining the operation of FIG. 1,

DETAILED DESCRIPTION OF THE INVENTION

Figure 1:
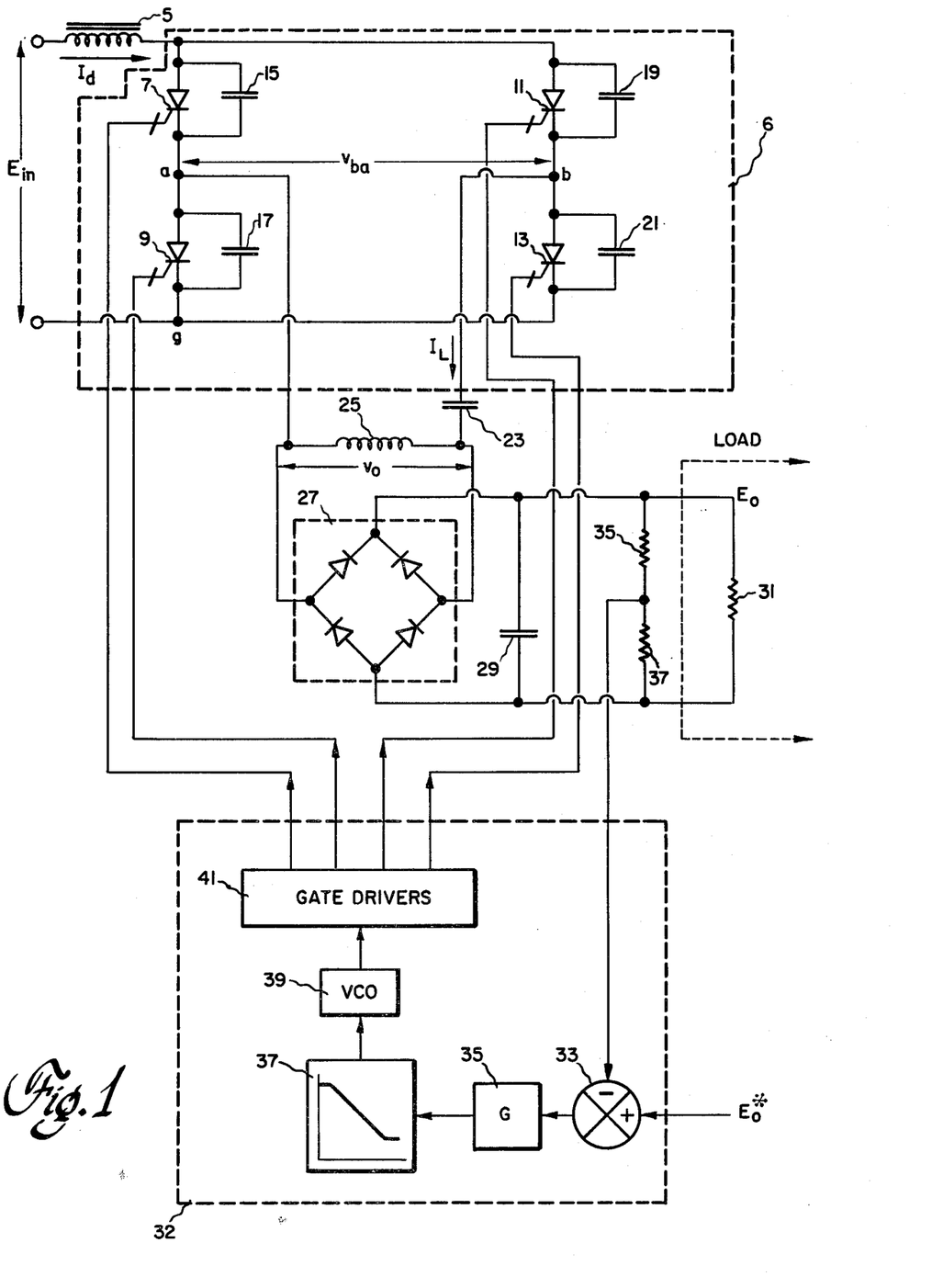
FIG. 1 is a part block diagram part schematic representation of a resonant dc-dc converter in accordance with the present invention.

Referring now to FIG. 1, a current input full bridge resonant dc-dc converter is shown. A dc input current obtained from a chopper or a phase controlled rectifier (not shown) supplies current through an inductor 5 to a full bridge inverter 6 having four switching devices with reverse voltage blocking ability such as a diode in series with a field effect transistor (FET), a diode in series with a bipolar junction transistor or gate turn-off silicon controlled rectifier (GTO). Four GTOs 7, 9, 11, 13 are shown in the Figure. The full bridge inverter has GTOs 7 and 9 connected series in a first leg of the bridge and GTOs 11 and 13 connected in series in the second leg of the bridge. Capacitors 15, 17, 19 and 21 are connected in parallel with GTOs 7, 9, 11 and 13, respectively, and serve as lossless snubbers. The legs of the inverter are connected between positive and negative rails with the positive rail connected to the inductor 5 and the negative rail to the negative terminal of the current supply (not shown). The output of the inverter 6 is taken between the series connected GTOs 7 and 9, and between the series connected GTOs 11 and 13 and is connected to a resonant ciruclt comprising the parallel combination of a capacitor 23 and an inductor 25. A full bridge diode rectifier 27 is connected across the resonant circuit. A filter capacitor 29 is connected in series across the output of the rectifier 27. A dc load such as a resistor 31 is connected across the capacitor 29. Transformer isolation between source and load can be obtained by substituting the primary winding of a high frquency transformer for inductor 25. The secondary winding of the transformer instead of inductor 25, would be connected to the diode bridge 27. The inductance for the resonant circuit would be obtained from the primary inductance of the transformer.

A control 32 has as an input a commanded dc voltage $E_o^*$ for the dc-dc converter. The commanded voltage is compared to a fixed proportion of the actual output voltage $E_o$ in a summer 33 to generate an error signal. The error signal is passed through a proportional plus integral regulator 35 that does not invert the signal to a limit circuit 37. The limit circuit assures that a lagging load is presented to the inverter by allowing the inverter to operate at or above the resonant frequency of the series resonant circuit. The output of the limit circuit is connected to a voltage controlled oscillator 39 which provides input signals to gate drivers 41 which alternately switch opposite corners of the inverter.

The operation of FIG. 1 will be described in connection with the waveforms of FIGS. 2A-E. A commanded dc output voltage $E_o^*$ is compared to the actual output voltage $E_o$ to develop an error signal. The error signal after passing through the proportional plus integral regulator circuit 35, provides an input signal to the limit circuit 37. The limit circuit provides a fixed maximum value and a fixed minimum value. The fixed maximum value when provided by the limit circuit to the voltage controlled oscillator results in a frequency supplied via the gate drivers to the GTOs that drive the resonant circuit at a frequency above its damped resonant frequency. As the error signal from summer 33 positively increases, signifying additional voltage step-up is called for, the limit circuit decreases the voltage supplied to the voltage controlled oscillator thereby decreasing the frequency supplied to the resonant circuit. There is a minimum output from the limit circuit to large error voltages to assure that frequencies below the damped resonant frequency are not reached. As the frequency is lowered toward resonance, the voltage across the inductor 25 of the resonant circuit increases with a constant voltage supplied to the converter. The current supplied to the converter varies with converter load. Increased voltage across the inductor 25 results in an increased voltage to be rectified by the diode bridge and hence a larger output voltage. The amount of voltage step up for a given frequency is dependent on the amount of damping provided by the rectifier filter and load. The closed loop control adjusts the frequency to achieve the desired step up.

Figure 3A:
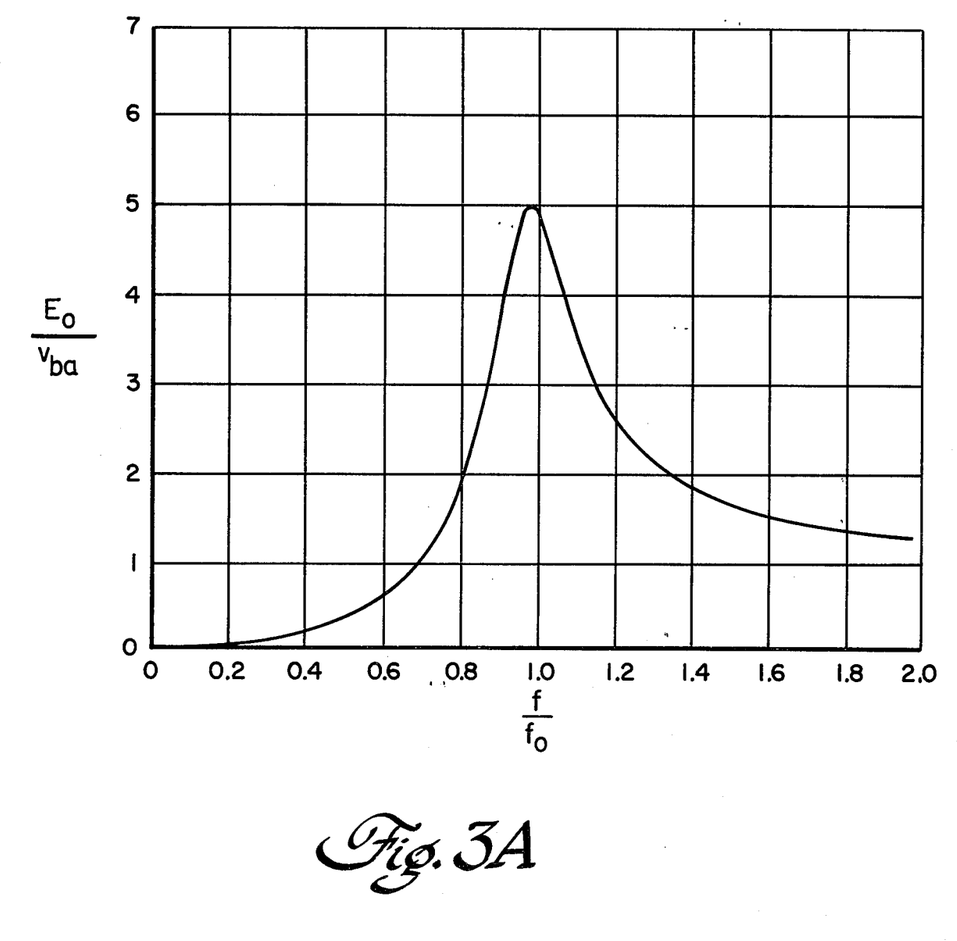
FIGS. 3A and 3B are graphs showing the ratio of average dc link output voltage to the ac input voltage supplied to the resonant circuit of the present invention, versus frequency, for two different values of damping, with FIG. 3A more highly damped than FIG. 3B.
Figure 3B:
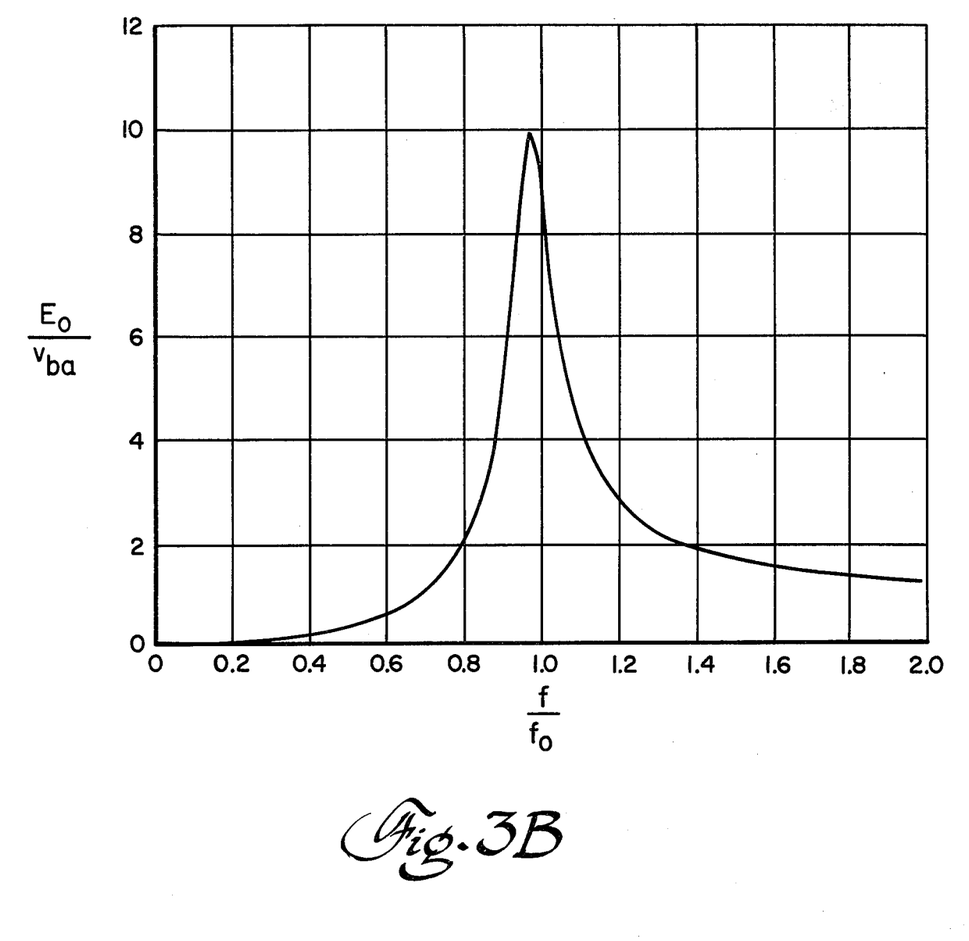

The graphs of FIGS. 3A and B show the ratio of the dc output voltage $E_O$ to the average dc input voltage to the resonant circuit $v_{ba}$ versus normalized frequency, with a frequency of 1 being the undamped resonant frequency $f_o$ normalized. FIGS. 3A and B are graphs for two values of damping with the graph of FIG. 3A being more highly damped due to a lower load resistance. The graphs of FIGS. 3A and 3B are based on the assumption that constant input voltage is supplied to the converter. The input voltage $E_{in}$ is related to the ac voltage supplied by the inverter by equation (1).

$$E_{in} = 0.9 v'_{ba} \cos\alpha \qquad (1)$$

where $v'_{ba}$ is the rms value of the voltage between point b and a.

$\cos\alpha$ is the power factor of the load connected to the inverter including the resonant circuit.

Figure 2:
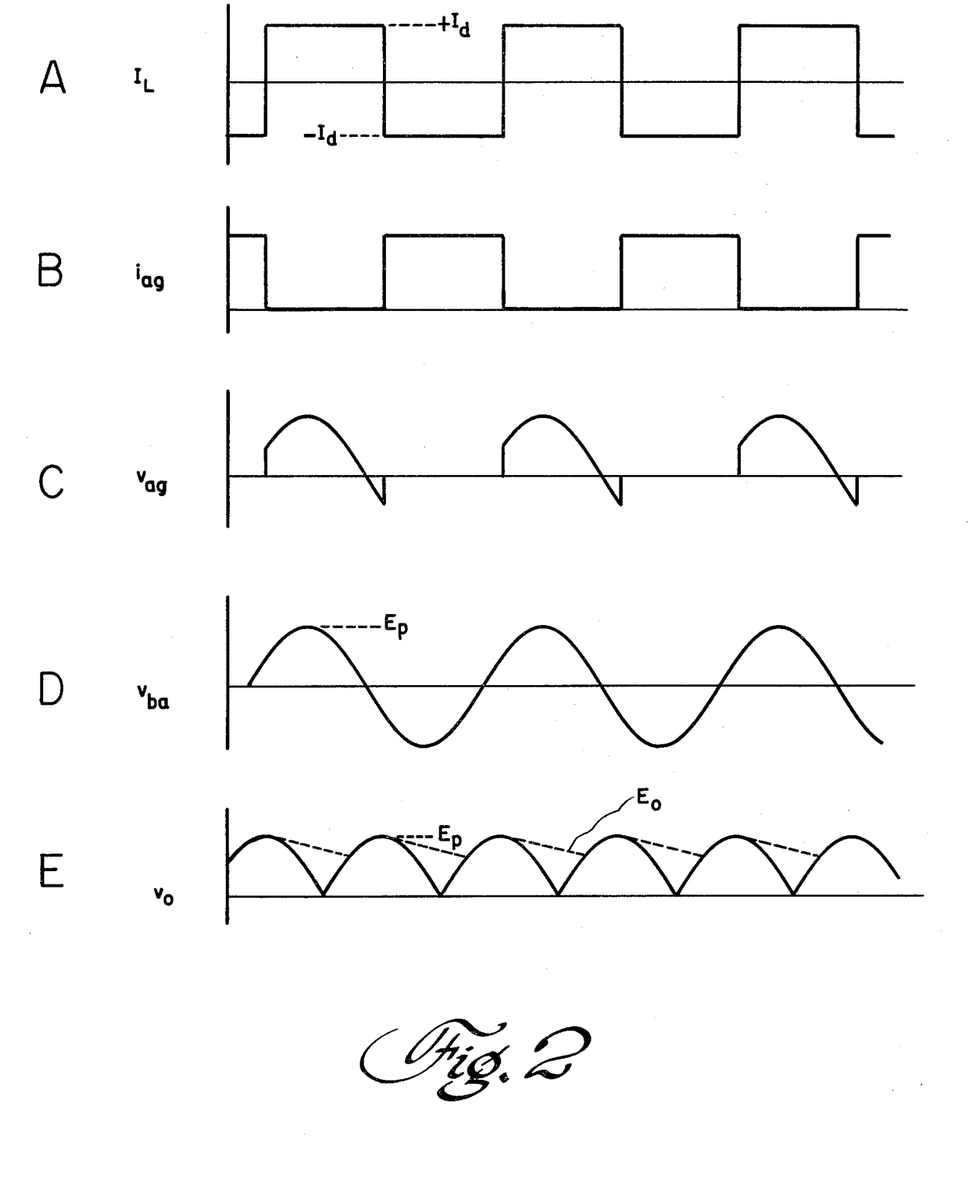
FIG. 2A shows the waveform of the current supplied to the resonant circuit.
FIG. 2B shows the waveform of the current in a switching device of the inverter.
FIG. 2C shows the waveform of the voltage across a switching device of the inverter.
FIG. 2D shows the waveform of the voltage at the input of the resonant circuit and FIG. 2E shows the absolute value of the voltage waveform at the output of the resonant circuit.

The gate drivers switch opposite corners of the inverter resulting in square waves of current $I_L$, shown in FIG. 2A being supplied to the resonant circuit. The waveform of the current through a GTO is shown in FIG. 2B. The square waves of current result in approximate sinusoidal voltages across the resonant circuit as shown in FIG. 2C which should result in easier electromagnetic interference filtering. The resonant circuit is driven at a frequency such that a lagging load is presented to the inverter 6 between points a and b, i.e., the current $i_L$ lags the voltage $v_{ba}$ and the GTOs are turned off by gate control rather than by anode current commutation. The lagging load is obtained by operating the inverter at frequencies at or above the damped resonant frequency of the resonant circuit. The values of the inductor and capacitor in the resonant circuit are selected to have a resonant frequency of thousands of hertz. The power to be handled by the converter determines the ratings of the switching devices. The switching time of the switching devices determines the attainable switching frequencies. High frequencies (20-30 KHz) permit smaller reactive components to be used. The limit circuit 37 assures that a frequency lower than the damped resonant frequency will not be commanded. Operating the inverter with a lagging load results in switching device waveforms that are opposite those normally encountered in thyristor inverters. In the present invention, there is negative voltage across the GTOs just before they conduct and they block voltage immediately when they are turned off by gate control as shown in FIG. 2D. Thus when the GTOs are gated on, there are no turn-on switching losses in the GTOs. Also, fast device reverse recovery characteristics are not needed since reverse voltage is not suddenly applied to a switching device to turn it off as in a thyristor circuit. To commutate the inverter, the two incoming GTOs such as 7 and 11 or 9 and 13) are gated on slightly before the outgoing GTOs turn off. This overlap is accomplished by gating the appropriate GTOs on and off, respectively, at the same time. The GTOs have a storage time so that when they receive the turn off signal there will be a delay until they turn off. The turn on delay for the GTOs is negligible compared to the turn off delay. During the overlap time, the incoming GTOs will not conduct since they have negative voltage applied to them as can be seen in FIG. 2D. Only after the outgoing GTOs have turned off will this negative voltage begin to reverse polarity, and the incoming GTOs conduct. Simple lossless snubbing can be employed since there are no switching losses at turn on. A small capacitor 15, 17, 19 and 21 is placed across each GTO 7, 9, 11 and 13 respectively to reduce turn-off dissipation. Since no resistor is needed in series with the snubber capacitor, no snubber dissipation results, that is, a lossless snubber action results allowing relatively large snubbers to be used, which in turn results in low GTO power dissipation and low voltage overshoots at device turn-off. Maximum voltage step up is obtained at the damped resonant frequency of the resonant circuit. Increasing the frequency of the inverter results in a decrease in the magnitude of the sinusoidal voltage in the resonant circuit. The voltage across the inductor 25 is rectified to obtain the dc voltage vo as shown in FIG.

2E. The output voltage is smoothed by the filter capacitance to obtain the output voltage $E_o$. As the frequency supplied to the resonant circuit is lowered toward the damped resonant frequency, the amount of voltage step up for a given load increases.

Figure 4A:
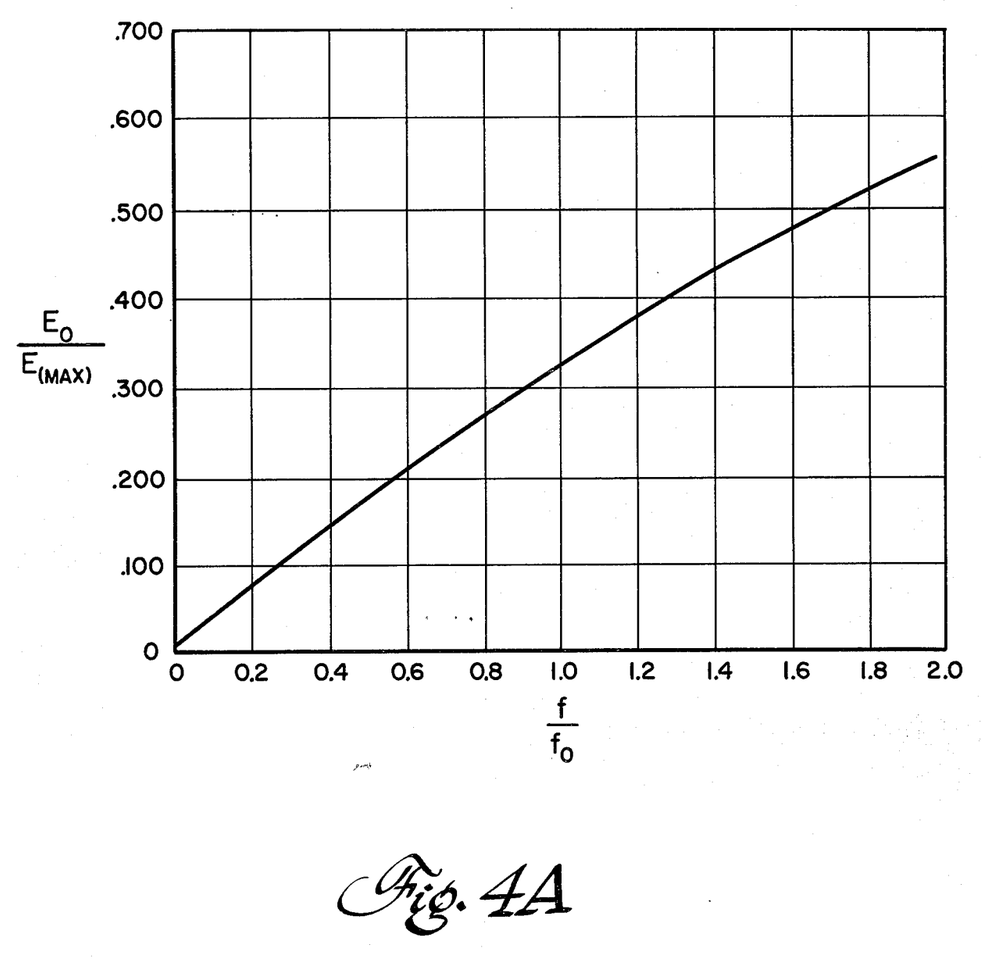
FIGS. 4A and 4B are graphs showing the ratio of the dc output voltage of the resonant inverter supplied with constant current to the maximum attainable output voltage, versus frequency, for two different values of damping, with FIG. 4A representing a more highly damped condition than FIG. 4B.
Figure 4B:
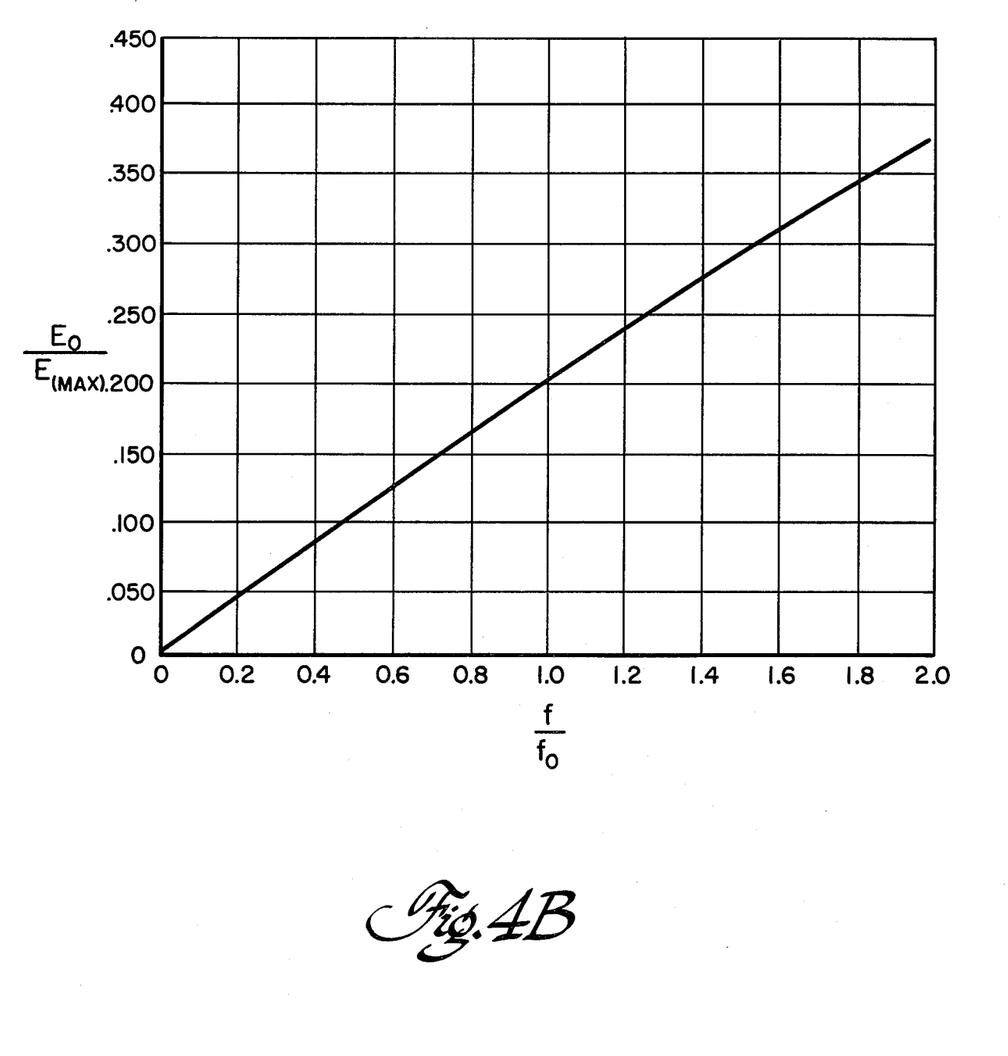

The ratio of the dc output voltage $E_O$ to the maximum possible output voltage for a given load ($E_o$ max) to the converter versus normalized frequency with a constant current supplied to the converter is shown in FIGS. 4A and B. FIGS. 4A and B represent two values of damping with the graph in FIG. 4A representing a more highly damped condition. The output voltage varies in a linear manner with frequency in the lightly damped condition represented by FIG. 4A. The linear relation allows simplified control since gain is not a function of operating point and the gain of the regulators in the control can be optimized for best response over the entire range of operation.

Figure 5:
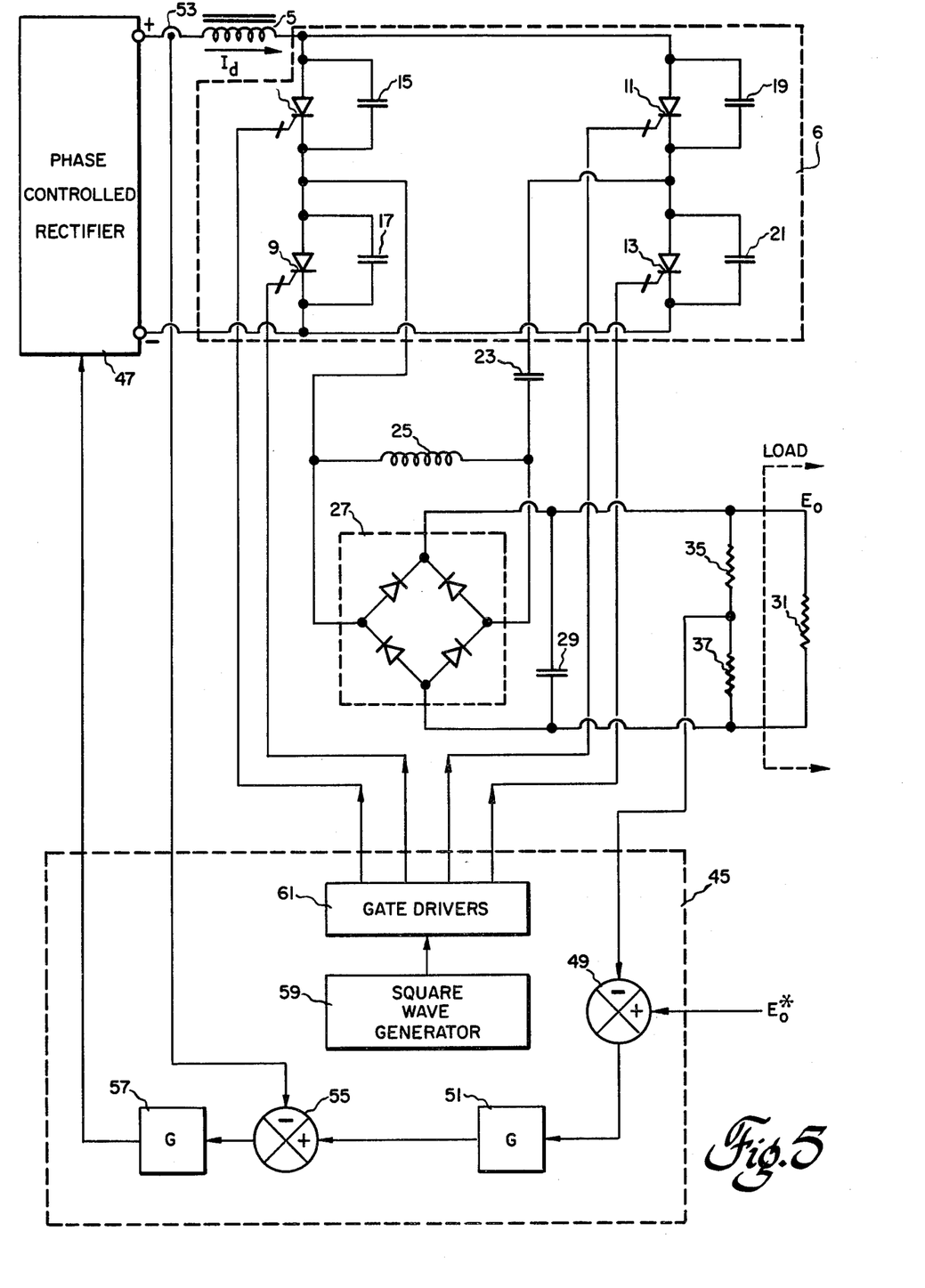
FIG. 5 is a part block diagram, part schematic representation of another embodiment of a resonant dc-dc converter in accordance with the present invention.

Referring now to FIG. 5, another embodiment of the present invention is shown. The dc-dc converter is the same as shown in FIG. 1 except a different control 45 is shown. A phase controlled rectifier 47 is shown supplying current to the converter. A chopper could alternatively be used. The control 45 has an input coupled to a voltage divider comprised of resistors 35 and 37 in series with one another and connected across the dc output of the converter. The signal from the voltage divider is compared to a commanded dc voltage $E_O^*$ in a summer 49. The resulting error signal is passed through a proportional plus integral regulator 51 to produce a current command $I_d^*$. The current command is compared to the actual current, as measured by current sensor 53 flowing from the phase controlled rectifier 47 to the converter, in a summer 55. The error signal
from summer 55 is passed through a proportional plus integral regulator 57 to provide a phase control command
to the phase controlled rectifier 47. A square wave generator 59 is connected to gate drivers 61 which alternately switches GTOs 7 and 13, and 9 and 11 at a constant frequency. Transformer isolation can be obtained in the same way as was discussed in connection with FIG. 1.

The operation of the converter of FIG. 5 will now be explained. Square wave generator 59 operates at or slightly above the damped resonant frequency to minimize circulating currents in the inverter 6 and make available the maximum step-up range of the converter. A commanded output voltage $E_o^*$ is compared to the actual output voltage and the resulting error signal, after passing through regulator 51, comprises a converter input current command $I_d^*$. The input current command is compared to the actual input current in summer 55 and the error signal is passed through regulator 57 to provide a phase angle indication to the phase controlled rectifier 47. Thus by controlling the current supplied to the converter the amount of step-up of the output voltage is controlled The foregoing describes a high frequency dc-dc converter which can achieve step up operation with greatly reduced switching losses While the invention has been particularly shown and described with reference to a preferred embodiment thereof, it will be understood by those skilled in the art that various changes in form and details may be made without departing from the spirit and scope of the invention.

What is claimed is:
1. A resonant dc-dc converter comprising:
   a current input inverter having gate turn off switch means capable of blocking reverse current, said inverter being supplied by an external dc power source and said inverter supplying square waves of current;
   a resonant circuit having an inductor connected in series with a capacitor, the output of said inverter being available across said inductor;
   rectifier means coupled across said inductor to rectify the sinusoidal voltage across said inductor to provide a dc output voltage; and
   control means for controlling the dc output voltage by varying the frequency at which said gate turn-off switch means operate, said control means having comparison means for comparing a commanded output voltage to the actual output voltage to develop an error signal, a voltage controlled oscillator coupled to switch means, and limit means for providing a lagging load to said inverter by limiting the error voltage supplied to said voltage controlled oscillator so that the switching frequency of the switch means is at or above the damped resonant frequency of the resonant circuit to reduce switching losses.

2. A resonant dc-dc converter comprising:
   a controllable dc power source;
   a current input inverter having gate turn-off switch means capable of blocking reverse current, said inverter being supplied by said controllable dc power source so as to supply square waves of current;
   a resonant circuit having a fixed inductor connected in series with a fixed capacitor, the output of said inverter being available across said inductor;
   rectifier means coupled across said inductor to rectify the sinusoidal voltage across said inductor to provide a dc output voltage; and
   control means for controlling the dc output voltage by varying the dc current supplied to said converter, said control means having means for switching said inverter switch means at a fixed frequency at or above the damped resonant frequency, a first comparison means for comparing a commanded output voltage to the actual output voltage to develop a voltage error signal; first regulator means coupled to said error signal for generating a current command, said comparison means for comparing the actual current supplied to said converter to said commanded current to develop a current error signal, and second regulator means for generating a command to said controllable dc power source.

3. The converter of claim 1 further including a snubber capacitor coupled across each of said switch means.

4. The converter of claim 2 further including a snubber capacitor coupled across each of said switch means.

5. The converter of claim 1 wherein said current input inverter comprises a full bridge inverter with four gate turn-off switch means.

6. The converter of claim 2 wherein said current input inverter comprises a full bridge inverter with four gate turn-off switch means.

7. The converter of claim 1 wherein said gate turnoff switch means with reverse voltage blocking ability comprises a gate turn off silicon controlled rectifier.

8. The converter of claim 2 wherein said gate turnoff switch means with reverse voltage blocking ability comprises a gate turn off silicon controlled rectifier.

* * * * *